(12) United States Patent
Byrne et al.

(10) Patent No.: US 11,167,941 B2
(45) Date of Patent: Nov. 9, 2021

(54) CONVEYOR SYSTEM WITH WEIGHING CAPABILITY

(71) Applicant: Terex GB Limited, Dungannon Tyrone (GB)

(72) Inventors: Richard Byrne, Dungannon Tyrone (GB); Lee Johnston, Lisbellaw Fermanagh (GB); Barry McMenamin, Omagh (GB); David Gibson, Dromore (GB)

(73) Assignee: Terex GB Limited, Dungannon Tyrone (GB)

( * ) Notice: Subject to any disclaimer, the term of this patent is extended or adjusted under 35 U.S.C. 154(b) by 156 days.

(21) Appl. No.: 16/274,764

(22) Filed: Feb. 13, 2019

(65) Prior Publication Data
US 2019/0263604 A1  Aug. 29, 2019

(30) Foreign Application Priority Data

Feb. 27, 2018 (GB) .................................... 1803200
Nov. 30, 2018 (GB) .................................... 1819633

(51) Int. Cl.
| | | |
|---|---|---|
| *G01G 19/52* | (2006.01) | |
| *B65G 65/32* | (2006.01) | |
| *B65G 65/42* | (2006.01) | |
| *B65G 43/08* | (2006.01) | |

(52) U.S. Cl.
CPC ........... *B65G 65/32* (2013.01); *B65G 65/425* (2013.01); *G01G 19/52* (2013.01); *B65G 43/08* (2013.01)

(58) Field of Classification Search
CPC ........ G01G 11/00; G01G 11/02; G01G 11/04; G01G 11/12; G01G 19/52; B65G 43/08; B65G 65/32; B65G 65/425; B65G 2203/0258

See application file for complete search history.

(56) References Cited

U.S. PATENT DOCUMENTS

| | | | |
|---|---|---|---|
| 4,682,664 A | 7/1987 | Kemp | |
| 5,561,274 A | 10/1996 | Brandorff et al. | |
| 5,590,976 A * | 1/1997 | Kilheffer | E01C 19/46 404/72 |
| 5,959,257 A * | 9/1999 | Campbell | G01G 11/003 177/119 |

(Continued)

FOREIGN PATENT DOCUMENTS

| | | |
|---|---|---|
| GB | 867726 A | 5/1961 |
| GB | 870348 A | 6/1961 |

(Continued)

*Primary Examiner* — Natalie Huls
(74) *Attorney, Agent, or Firm* — Burns & Levinson LLP; Joseph P. Quinn; Marlo Schepper Grolnic

(57) ABSTRACT

A conveyor system comprising a conveyor and a conveyor weighing apparatus. The conveyor weighing apparatus has a load determination device for determining the load exerted the conveyor on a conveyor support. The conveyor weighing apparatus may have measurement devices for measuring the angle and speed of the conveyor. The load determination device determines the load exerted by the at least section of conveyor in both laden and unladen states, and the results are combined with the speed and angle measurements, and with known system constants, to calculate the weight of material being conveyed.

20 Claims, 5 Drawing Sheets

(56) References Cited

U.S. PATENT DOCUMENTS

| | | | | |
|---|---|---|---|---|
| 6,232,565 B1 * | 5/2001 | Gottlober | ............ | A01F 15/0875 |
| | | | | 177/136 |
| 6,329,613 B1 * | 12/2001 | Tomlinson | ............. | G01G 11/00 |
| | | | | 177/145 |
| 6,407,348 B1 * | 6/2002 | Scott | ....................... | B65G 21/10 |
| | | | | 14/70 |
| 2003/0132036 A1 * | 7/2003 | Johnson | ............... | G01G 11/003 |
| | | | | 177/132 |
| 2008/0035390 A1 * | 2/2008 | Wurz | ................. | G01G 19/4148 |
| | | | | 177/25.15 |
| 2008/0047760 A1 * | 2/2008 | Georgitsis | ............. | G01G 19/40 |
| | | | | 177/1 |
| 2010/0059291 A1 * | 3/2010 | Lowe | .................... | G01G 11/12 |
| | | | | 177/52 |
| 2011/0108331 A1 * | 5/2011 | Monti | .................... | G01G 11/00 |
| | | | | 177/145 |
| 2011/0196877 A1 * | 8/2011 | Sakagami | ............. | B65G 43/08 |
| | | | | 707/748 |
| 2013/0015043 A1 * | 1/2013 | Tout | ....................... | B65G 19/18 |
| | | | | 198/810.04 |
| 2014/0034448 A1 * | 2/2014 | van Blokland | ........ | G01G 11/04 |
| | | | | 198/341.04 |
| 2015/0352596 A1 * | 12/2015 | Yamakawa | ................ | B07C 5/36 |
| | | | | 209/596 |
| 2016/0348503 A1 * | 12/2016 | Rimmington | ............ | E21C 35/12 |
| 2017/0030764 A1 * | 2/2017 | Lawn | .................... | G01G 19/021 |
| 2017/0043975 A1 * | 2/2017 | Mellin | ................. | B65H 18/028 |
| 2017/0275993 A1 * | 9/2017 | Rimmington | ............ | E21C 25/10 |
| 2019/0128729 A1 * | 5/2019 | Hung | ...................... | B65G 13/00 |
| 2020/0049548 A1 * | 2/2020 | Van Blokland | ........ | G01G 11/04 |
| 2020/0199829 A1 * | 6/2020 | Avans | ..................... | E01C 23/127 |

FOREIGN PATENT DOCUMENTS

| | | |
|---|---|---|
| GB | 2128345 A | 4/1984 |
| SU | 1755057 A1 | 8/1992 |
| WO | 2006067442 A1 | 6/2006 |

* cited by examiner

CONVEYOR SYSTEM WITH WEIGHING CAPABILITY

CROSS-REFERENCE TO RELATED APPLICATIONS

This application claims priority to Application No. 1803200.3, filed on Feb. 27, 2018 in the United Kingdom, and Application No. 1819633.7, filed on Nov. 30, 2018 in the United Kingdom, the contents of which are hereby incorporated by reference in their entirety for all purposes.

FIELD OF THE INVENTION

This invention relates to conveyor assemblies, and in particular to conveyor assemblies with means for weighing material conveyed by a conveyor.

BACKGROUND OF THE INVENTION

It is well known to utilise a conveyor to deliver material to, or transport material from, a wide range of material processing machinery. Where a conveyor is used to transport processed material from the material processing apparatus it is often advantageous to ascertain an indication of the amount of material being transported for the purposes of determining when a sufficient amount of material has been processed, or to determine how much processed material should be charged for. Typically, in order to ascertain a value for the amount of material delivered by a conveyor, traditional industrial weighing scales are placed under one or more points of the conveyor. However, systems employing traditional weighing scales in this manner are expensive. Moreover, even whilst the expense of such systems can be high, the levels of accuracy achieved tends to be low, resulting in inaccurate 25 amounts of material processed, or under/overcharging for processed material.

It would be desirable to provide a conveyor system capable of accurately weighing the material conveyed by a conveyor which is both accurate and relatively inexpensive.

SUMMARY OF THE INVENTION

From one aspect the invention provides a conveyor system comprising a conveyor and a conveyor weighing apparatus, the conveyor weighing apparatus comprising:
load determination means for determining loads exerted by at least a section of the conveyor on at least one conveyor support, and/or load determination means for measuring at least one load related operating parameter of drive means for said conveyor, to produce load data; and
calculation means for calculating at least one weight-related measurement for material conveyed by said conveyor using said load data.

In preferred embodiments, the conveyor system comprises a conveyor and a conveyor weighing apparatus, the conveyor weighing apparatus comprising: a load determination means configured to determine the load exerted by at least a section of the conveyor on a conveyor support means; and at least one measurement means configured to determine the value of at least one variable in relation to the positioning and/or operational parameters of the conveyor; wherein the load determination means determines the load exerted by the at least section of conveyor in both laden and unladen states such that the values obtained may be combined with the values of the at least one variable obtained from the at least one measurement means, and values of known constants in relation to the geometry of the at least section of the conveyor, its supporting structure, and/or the material conveyed by the at least section of the conveyor, to allow the calculation of the weight of material being conveyed by the at least section of the conveyor.

Advantageously, it is possible to obtain an accurate measurement for the weight of material conveyed by the at least section of the conveyor using several easily and inexpensively measured variables in conjunction with various known constants.

Further advantageously, the weighing of the entire conveyor and any material thereon using traditional, and expensive, weighing scales is negated.

A second aspect of the invention provides a conveyor weighing apparatus comprising: load determination means for determining loads exerted by at least a section of a conveyor on at least one conveyor support, and/or load determination means for measuring at least one load related operating parameter of drive means for said conveyor, to produce load data, calculation means for calculating at least one weight-related measurement for material conveyed by said conveyor using said load data.

A third aspect of the invention provides a material processing apparatus comprising a conveyor system of the first aspect of the invention, said at least one conveyor support being coupled between said at least a section of the conveyor and a supporting structure of said material processing apparatus.

A fourth aspect of the invention provides a method of weighing the material transported by a conveyor or section thereof, the method comprising: determining loads exerted by at least a section of the conveyor on at least one conveyor support, and/or measuring at least one load related operating parameter of drive means for said conveyor, to produce load data, and calculating at least one weight-related measurement for material conveyed by said conveyor using said load data.

Ideally, the conveyor weighing apparatus comprises a calculation module in operable communication with at least the load determination means and the measurement means. Alternatively, data from the load determination module and the measurement means is manually inputted into the calculation module. Preferably, the calculation module comprises a memory module for storing at least the values of the known constants. Ideally, the memory module has calculation instructions stored thereon in relation to the calculations required in order to calculate the weight being conveyed by the at least section of the conveyor.

In typical embodiments, said at least one conveyor support comprises a hydraulic ram.

Optionally, the load determination means comprises one or more force sensor, for example comprising one or more load cell and/or one or more strain gauge coupled to said at least one conveyor support. The load determination means may comprise one or more hydraulic pressure transducer, or sensor, provided in said hydraulic ram or in a hydraulic circuit connected to said hydraulic ram.

In preferred embodiments, the system may include measurement means for measuring the speed of said conveyor, said calculation means being configured to calculate said at least one weight-related measurement using the measured speed. The system may include measurement means for measuring an angle of inclination of said at least a section of the conveyor, said calculation means being configured to calculate said at least one weight-related measurement using the measured angle.

The drive means may comprise a hydraulic motor and said at least one load related operating parameter comprises a hydraulic flow rate and/or a hydraulic pressure of said hydraulic motor. Alternatively, the drive means may comprise an electric motor and said at least one load related operating parameter comprises an electrical power, current and/or voltage drawn by said electric motor.

Typically the drive means comprises a drive shaft, and said at least one load related operating parameter comprises a torque of said drive shaft.

Typically, the load determination means is configured to determine the load exerted by the at least a 35 section of conveyor in both a laden state and an unladen state of the conveyor, and/or is configured to measure said at least one load related operating parameter of the drive means in both a laden and unladen state of the conveyor.

Typically, said calculation module is configured to calculate said at least one weight-related 40 measurement using at least one system constant representing at least one aspect of the geometric configuration of said at least a section of the conveyor and the at least one conveyor support. Said at least one geometric aspect typically comprises the spatial coordinates of each end of the, or each, conveyor support and/or a length of said at least a section of the conveyor.

Said at least one conveyor support is typically coupled between said at least a section of the conveyor and a supporting structure.

The load determination means may conveniently comprise any one or more of a pressure transducer (or sensor), a strain gauge, or a load cell coupled to said at least one conveyor support to measure pressure, strain, or force experienced by the at least one conveyor support.

Said measurement means may comprise means for measuring the speed of a belt of said at least a section of the conveyor. Said measurement means may comprise a rotary speed sensor coupled to a rotary component of a drive system of said at least a section of the conveyor. The measuring means may comprise means for measuring the rate of flow of oil to hydraulic drive means of the at least a section of the conveyor.

The means for determining the angle comprises an angle transducer (or sensor). The means for determining the angle may comprise one or more linear transducers coupled to said at least one conveyor support to determine a value for an extension of said at least one conveyor support.

The at least a section of the conveyor may have a first end fixably or pivotably mountable to a second section of the conveyor system and a second free end distal the first end.

The at least section of the conveyor may be supported by said at least one conveyor support at a support location between the first and second ends of the at least a section of the conveyor.

Preferably, the load determination means is operably mountable to the conveyor support means such that at least one physical change or at least one change in the forces experienced by the conveyor support means may be determined.

Preferably, the load determination means comprises at least one pressure transducer, typically at least one hydraulic pressure transducer, coupled to the conveyor support means such that pressure acting on or within the at least one conveyor support means can be determined therefrom.

Alternatively, the load determination means comprises a strain gauge operably mountable to the conveyor support means such the strain experienced on or within the at least one conveyor support means can be determined therefrom.

Further alternatively, the load determination means comprises a load cell operably mountable to the conveyor support means such that the force acting on or within the at least one conveyor support means can be determined therefrom.

Ideally, the at least one measurement means comprises a means for measuring the speed of a belt of the at least section of the conveyor.

Preferably, the means for measuring the speed of the belt of the at least section of the conveyor comprises a tachometer or rotary speed sensor. Any conventional tachometer/rotary speed sensor may be used. For example a typical speed measuring device (sometimes referred to as a speed wheel) may comprise, for a wheel of a known diameter, a plate (or other part) rotating with the wheel, the plate having a plurality of apertures or teeth, and a proximity sensor configured to send signal pulses in response to detection of the apertures or teeth. Alternatively a conventional RPM (revolutions per minute) counter, or device for determining the rate of rotation or angular velocity may be provided. Any such device may be coupled to a pulley or roller of the belt of the conveyor as is convenient.

Optionally the means for measuring the speed of a belt of the at least section of the conveyor comprises means for measuring the rate of flow of oil to a hydraulic drive apparatus engagable to drive the belt of the at least section of the conveyor, the speed of the belt being derivable from the rate of flow of the oil.

Preferably, a further measurement means is provided for determining the angle of the at least a section of the conveyor relative to a horizontal plane or other reference. The measurement means for determining the angle of the at least section of the conveyor relative to the horizontal plane may be an angle transducer or other angle sensor.

Alternatively, the measurement means for determining the angle of the at least section of the conveyor relative to a horizontal plane comprises linear transducers operably mountable to the conveyor support means such that a value for an extension of the conveyor support means can be obtained therefrom.

Ideally, the at least a section of the conveyor has a first end pivotably mountable to a section of the conveyor system and a second free end distal the first end. Alternatively, the at least a section of the conveyor has a first end fixably mountable to a section of the conveyor system and a second free end distal the first end. Preferably, the at least section of the conveyor is supported by the conveyor support means at a support location between the first and second ends of the at least section of the conveyor.

The load determination means may comprise at least one load measuring pin coupled between said at least one conveyor support and said at least a section of the conveyor, or between said at least one conveyor support and a supporting structure. Said at least one load measuring pin may be part of a pivotable joint between said at least one conveyor support and said at least a section of the conveyor, or between said at least one conveyor support and a supporting structure.

Said calculation means may be configured to determine a resultant load acting along the longitudinal axis of said at least one conveyor support. Said calculation means may be configured to determine said resultant load by resolving the load measured by said load determination means along the longitudinal axis of said at least one conveyor support.

Said calculation means may be configured to calculate a weight of material on said at least one conveyor section as:

$$W = \frac{F_R * F}{G}$$

where $F_R$ is the resultant load, F is the perpendicular distance between the line of action of $F_R$ and a lower end said at least one conveyor section, and G is the perpendicular distance between the lower end of said at least one conveyor section and a location of the centre of gravity of a notional uniformly distributed load of material on the at least a section of the conveyor.

The known system constants may comprise any one or more of: the length of the at least section of the conveyor; the spatial locations of the first and second ends of the conveyor support means; the spatial location of the first and second ends of the conveyor support means is the spatial location relative to the first end of the conveyor; the approximate centre of gravity of a load of material on the at least section of the conveyor; the load of material on the at least section of the conveyor is assumed to be a uniformly distributed load; the diameter of a bore of the hydraulic cylinder of the conveyor support means; the diameter of a piston rod of the conveyor support means; F; G.

The result of the calculation of the weight of material being conveyed by the at least section of the conveyor may be expressed as the instantaneous tonnage on the at least section of the conveyor and/or the instantaneous tonnage transported by the at least section of the conveyor in any given period of time. The given period of time may for example be one hour, the total time lapsed since engine start, and/or the total time lapsed since a specified date and time.

Other preferred features are recited in the dependent claims appended hereto.

Further advantageous aspects of the invention will be apparent to those ordinarily skilled in the art upon review of the following description of a specific embodiment and with reference to the accompanying drawings.

BRIEF DESCRIPTION OF THE DRAWINGS

Embodiments of the invention are now described by way of example and with reference to the accompanying drawings in which like numerals are used to denote like parts and in which.

DETAILED DESCRIPTION OF THE DRAWINGS

The present teaching will now be described with reference to an exemplary conveyor system. It will be understood that the exemplary conveyor system is provided to assist in an understanding of the present teaching and are not to be construed as limiting in any fashion. Furthermore, elements or components that are described with reference to any one Figure may be interchanged with those of other Figures or other equivalent elements without departing from the spirit of the present teaching.

Figure 1:
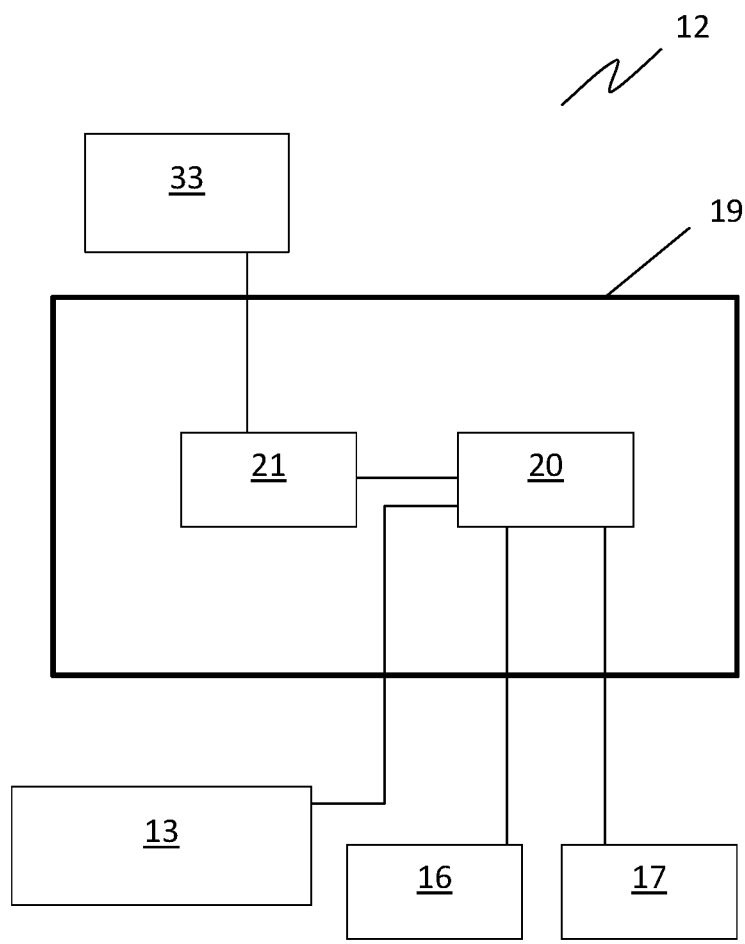
FIG. 1 is a schematic view of a conveyor weighing apparatus embodying one aspect of the invention, the conveyor weighing apparatus being part of a conveyor system embodying another aspect of the invention.
Figure 2:
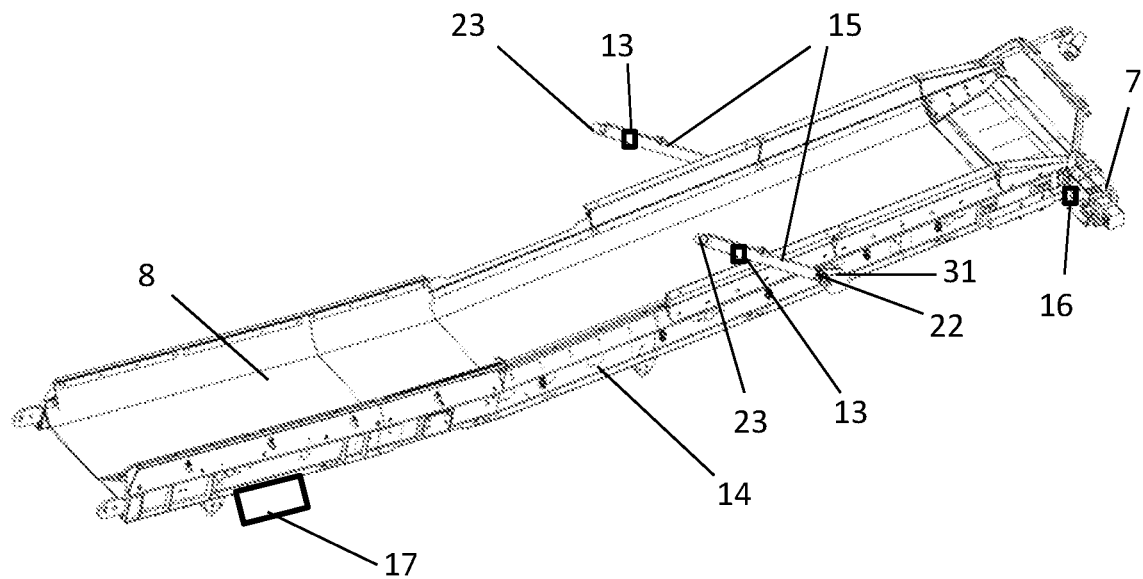
FIG. 2 is a perspective view of a first section of a conveyor having load determination means and measurement means, the first conveyor section being part of the conveyor system.
Figure 3:
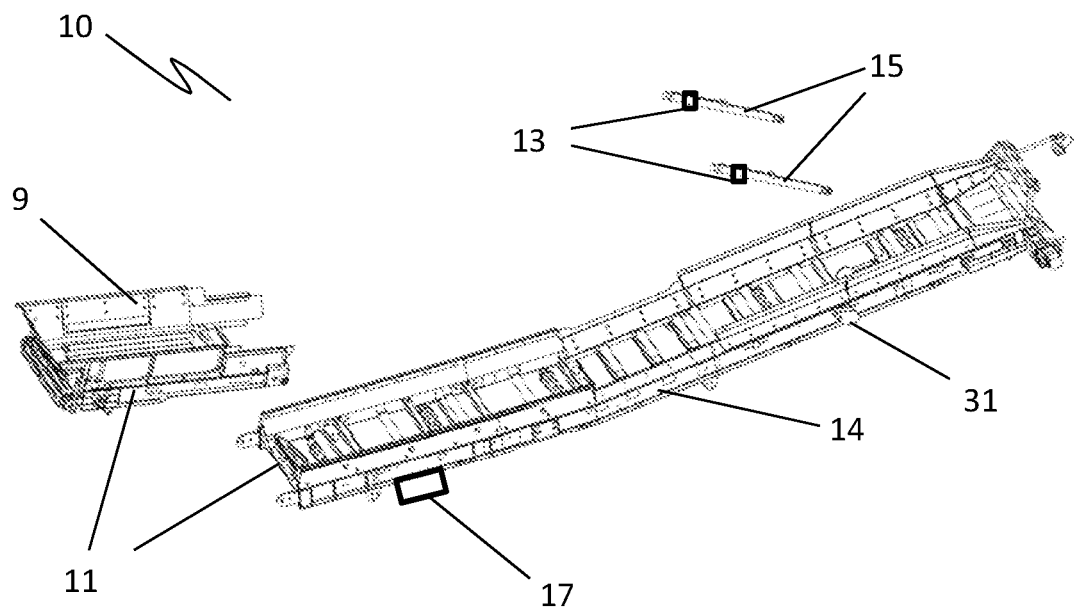
FIG. 3 is an exploded perspective view of a conveyor comprising said first section and a second conveyor section.
Figure 4:
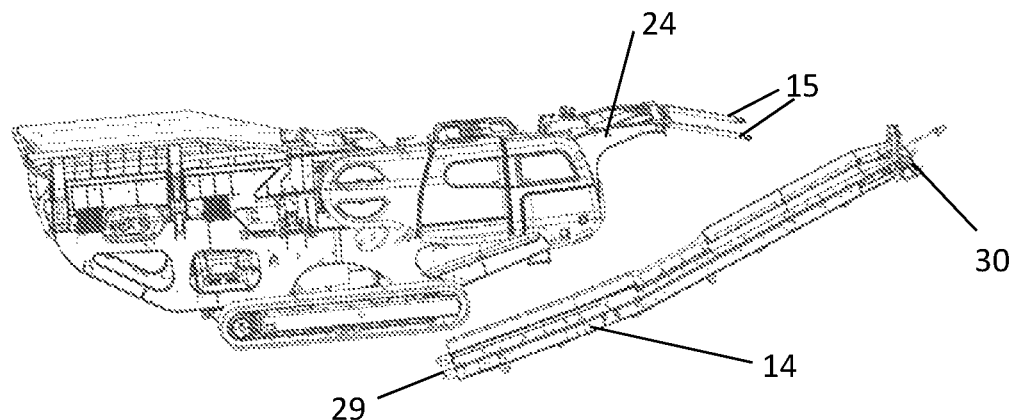
FIG. 4 is an perspective view of a material processing apparatus showing said first conveyor section exploded.

Referring now to the accompanying drawings, there is illustrated a conveyor system 10 comprising a conveyor 11 and a conveyor weighing apparatus 12. The illustrated conveyor 11 has, by way of example only, a first portion, or section 14 (which may be referred to as the head section) and a second portion, or section 9 (which may be referred to as the tail section). The conveyor sections 9, 14 may be detachable from one another. When assembled, the conveyor sections 9, 14 may be coupled together in a fixed relationship, or in an adjustable relationship as desired, for example the conveyor sections 9, 14 may be pivotably adjustable with respect to each other about an axis that is transverse of the conveyor. The conveyor 11 is typically a belt conveyor, the belt 8 being shown in FIG. 2 but not in FIG. 3.

Figure 5:
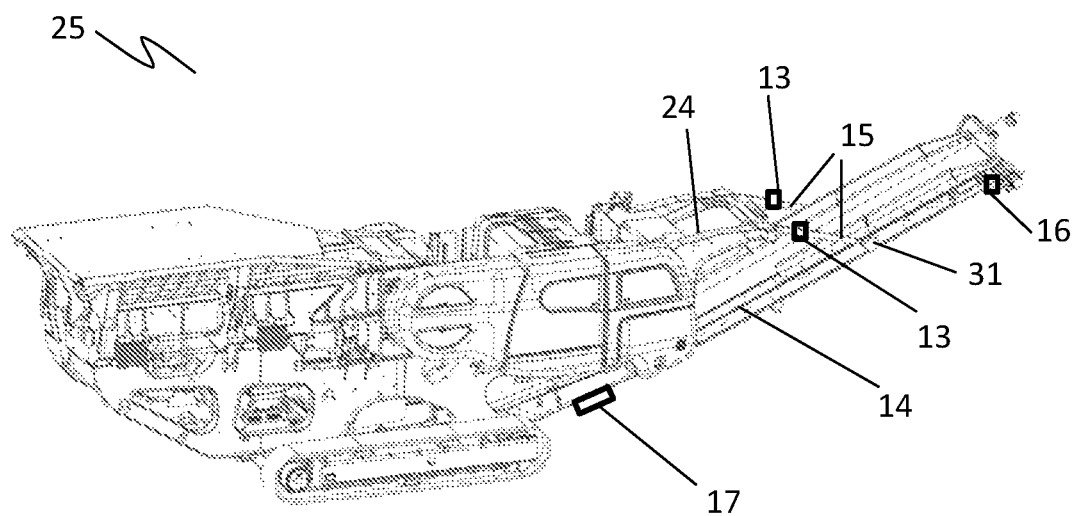
FIG. 5 is a perspective view of a material processing apparatus embodying another aspect of the invention and including a conveyor system and conveyor weighing apparatus embodying the invention.

The conveyor weighing apparatus 12 comprises at least one load determination device 13 configured to determine the load exerted by one or more section 14 of the conveyor 11 on at least one, and typically more than one, conveyor supports 15. In the preferred embodiment, the conveyor weighing apparatus 12 is operable with the first section 14 of the conveyor 11, which may be referred to as the supported conveyor section 14. In the illustrated example, first and second conveyor supports 15 are provided on opposite sides of the conveyor section 14 and support the conveyor section 14 with respect to a material processing machine 25, as can best be seen from FIG. 5. The supports 15 typically comprise an extendible strut or other extendible structure or device. The material processing machine 25 may for example include one or more material processing devices such as a screen and/or a crusher which feed material onto the conveyor 11.

The conveyor weighing apparatus 12 also comprises one or more measurement devices 16, 17 configured to determine the value of one or more variable parameters in relation to the positioning of and/or the operation of the conveyor 11, or at least the relevant conveyor section 14. In the embodiment shown in the drawings, a first measurement device 16 comprises a rotary speed sensor, e.g. a speed-wheel or RPM counter, or other conventional rotary speed measuring device, coupled to any convenient rotary component of a drive system of the conveyor 11, and in particular of the conveyor section 14, to determine the speed of the conveyor, in particular the speed of the belt 8. The drive system may be of any conventional type, typically including one or more motor and suitable rotary components such as rollers, drive shaft(s), driven shaft(s) and pulley(s), any of which may be used in measuring speed as is convenient.

Alternatively, the first measurement device 16 comprises a device for measuring the rate of flow of oil to hydraulic drive means 7 (typically comprising a hydraulic motor) provided to drive the belt 8. In this embodiment, the speed of the belt 8 may be derived from the rate of flow of the oil.

Any conventional hydraulic flow meter (not shown) may be provided for this purpose. Alternatively, the first measurement device 16 comprises a current sensor for measuring current drawing by electric drive means 7 (typically comprising an electric motor) provided to drive the belt 8. In this embodiment, the speed of the belt 8 may be derived from the current level.

In embodiments where the angle of inclination of the conveyor section 14 is adjustable, a second measurement device 17 may be provided, typically in the form of an angle transducer or inclinometer, installed at any convenient location on the conveyor section 14 such that it may determine the angle of the conveyor section 14 relative to horizontal or other reference (e.g. with respect to a part of the machine or other support structure that supports the conveyor 14). Alternatively, the second measurement device 17 may comprise means for determining the amount to which any one of, or each, conveyor support 15 is extended, for example one or more linear transducer provided on any one of, or each, conveyor support 15 such that a value indicative of an extension of the conveyor supports 15 can be obtained from the output of the transducer(s). The angle of the conveyor section 14 in relation to the horizontal or other reference may readily be derived from the determined extension of the conveyor supports 15. Optionally, an angle transducer (not shown) maybe provided to measure the inclination angle of a part of the machine 25, or other support structure, that supports the conveyor 14 with respect to horizontal. For example, such an angle transducer, or sensor, may be provided on the chassis of the machine 25. This additional angle transducer allows the system to account for situations where, for example, the machine 25 is located on sloping ground. The measured angle of inclination of the machine 25 (or other support structure) can be used with the measured relative angle of inclination of the conveyor 14 (in particular when the conveyor angle is measured with respect to part of the machine/support structure) to calculate an absolute angle of inclination for the conveyor 14.

Preferably, the load, determination device 13 determines the load exerted by the conveyor section 14 in both a laden state and an unladen state. These values may be used with the values of the parameters measured by the measurement devices 16, 17, and values of known constants representing one or more physical features, in particular geometric features, of the system. These constants may represent one or more aspect of the geometry of the conveyor 11, or conveyor section 14 as applicable, its support structures, and/or the material conveyed by the conveyor 11, to allow one or more calculations of, or relating to, the weight of material being conveyed by the conveyor 11 to be made. For example, the total weight of material processed, the weight per unit length of conveyor and/or the weight per unit time may be calculated as required. Consequently, it is possible to obtain accurate measurements for the weight of material conveyed by the conveyor 11 using easily and inexpensively measured parameters in conjunction with known system constants. In addition, the weighing of the entire conveyor 11 and any material thereon using traditional, and expensive, weighing scales is negated. Readings from the load determination device 13 may be taken on an ongoing basis at time intervals that may be specified by a user, the most typical time intervals being every one second, every five seconds, and every ten seconds. In the most preferable case, readings from the load determination device 13 are taken every one second.

The preferred conveyor weighing apparatus 12 comprises a calculation module 19 in communication with at least the load determination device 13 and the measurement devices 16, 17 such that data from these devices may be provided to the calculation module 19. The calculation module 19 may be in communication with the load determination device 13 and the measurement devices 16, 17 via a wired or a wireless connection as is convenient. Alternatively, data from the load determination device 13 and/or the measurement devices 16, 17 is manually input into the calculation module 19. The calculation module 19 may be provided at any convenient location on the conveyor 11 or the machine 25 of which the conveyor 11 is part.

The preferred calculation module 19 comprises a memory 20, which may comprise any suitable computer or data memory, for storing the values of the known constants, and optionally also the data provided from the load determination device 13 and measurement devices 16, 17. The memory 20 may also store a set of instructions, conveniently in the form of computer software, for performing the required weight-related calculations. The calculation module 19 typically comprises a processor 21 (e.g. a microprocessor, microcontroller or PLC) capable of executing the instructions stored in the memory module 20 such that the processor 21 calculates the weight of material processed by the conveyor 11 from the data received or input from the load determination device 13, the measurement devices 16, 17, and the known constants stored in the memory module 20. In a preferred embodiment, the calculation module 19 comprises a programmable logic controller (PLC).

In preferred embodiments, the, or each, conveyor support 15 comprises a hydraulic ram (commonly referred to as a hydraulic cylinder). The hydraulic ram 15 itself may serve as the support 15. Alternatively, the hydraulic ram 15 may be provided as a part of the conveyor support 15. For example, the ram 15 may be coupled to a telescopic or otherwise linearly extendible support structure (e.g. a strut or tie) for effecting extension and retraction thereof. In alternative embodiments, any other convenient actuator, e.g. an electrical linear actuator, may be provided instead of the hydraulic ram. Alternatively still, the conveyor support 15 may be of fixed length in which case the ram or other actuator is not required.

In the illustrated embodiment a respective conveyor support 15 is provided on each lateral side of the conveyor section 14. Each conveyor support 15 has a first end 22 in coupled to the conveyor section 14 and a second end 23 distal the first end 22 coupled to a support structure 24. The conveyor supports 15 may be pivotably, or fixedly, coupled at their first end 22 to the conveyor 14, and/or at their second end 23 to the support structure 24, as required. In typical embodiments, the support structure 24 is part of a material processing apparatus 25 of which the conveyor system 10 forms a part. It should be understood that, depending on the loading and positioning of the conveyor supports 15, one conveyor support only may be suitable. The conveyor supports 15 shown in the drawings support the conveyor 11 from above. Alternatively or in addition, however, one or more conveyor supports may be provided which support the conveyor from below.

In preferred embodiments, the, or each, load determination device 13 is provided on, or otherwise coupled to, the respective conveyor support 15 in order to measure load exerted on the conveyor support. Optionally, the load determination device 13 comprises one or more pressure transducer (or pressure sensor), in particular one or more hydraulic pressure transducer (or sensor). The, or each, pressure sensor may be provided in the cylinder of the respective hydraulic ram, or connected to a hydraulic line or hydraulic circuit connected to the ram, in order to measure pressure acting on or within the hydraulic ram. Alternatively, or in addition, the load determination device 13 may comprise one or more force sensor, for example one or more strain gauge or one or more load cell. The, or each, force sensor may be coupled to the respective conveyor support 15 at any convenient location in order to measure force exerted on the conveyor support 15. For example, one or more strain gauge may be provided on a surface of the ram or other part of the support 15 to measure the strain experienced by the conveyor support 15. In the case of a load cell, the load cell may for example be incorporated into the conveyor support, or provided between the conveyor support and the conveyor 14, or between the conveyor support and the support structure 24, in order to measure the load acting on the conveyor support 15. It will be appreciated that the load determination device 13 may be provided for only one of the conveyor supports 15 in embodiments where a suitable reading may be achieved from a single support 15. In the illustrated embodiment, the readings from the load determination device 13 may be used along with known parameter values of the ram 15, in particular the diameter of the hydraulic cylinder bore and diameter of the hydraulic cylinder piston rod, to derive a value for the average tension in the hydraulic ram 15.

In alternative embodiments the load determination device comprises means for measuring one or more operating parameter of the drive means 7 of the conveyor 11, or at least of the conveyor part 14. In typical embodiments the drive means 7 drives the belt 8. The drive means 7 may comprise a hydraulic motor, in which case the relevant operating parameter may be any one or both of the hydraulic fluid flow rate or the hydraulic fluid pressure of the hydraulic motor during use (which may be measured from the hydraulic circuit connected to the motor by any conventional hydraulic flow meter or pressure transducer). Alternatively, the drive means 7 may comprise an electric motor, in which case the relevant operating parameter may be the electrical power, voltage and/or current drawn by the motor during use (which may be measured from the electrical circuit connected to the motor using any conventional current and/or voltage sensor). Alternatively, or in addition, the load determination device may comprise means for measuring the torque of a drive shaft of the drive means 7. Any conveniently torque sensor may be coupled to the drive shaft for this purpose. The measurement of power, flow, torque or pressure, as applicable, is preferably taken in both the laden and unladen states of the conveyor, and utilised in calculations in relation to the weight of material being conveyed by the conveyor in a similar manner as outlined above. It will appreciated that a variety of alternative devices may be employed to monitor changes in the physical condition of the hydraulic cylinders 15 or the measure the forces experienced by them, and as such the scope of the invention is not limited to the examples provided above in relation to the load determination device 13.

In preferred embodiment, at least the section 14 of the conveyor is pivotably mounted at or about a first end 29 and has a second free end 30 distal the first end 29. The pivotable section 14 of the conveyor is supported by the hydraulic rams 15 at a support location 31 between its first and second ends 29, 30. The known constants include the length of the pivotable section 14 of the conveyor. The known constants also include the spatial locations of the first and second ends 22, 23 of the hydraulic cylinders relative to the pivotable mounting of the first end 29 of the pivotable section 14 of the conveyor. The spatial location of the first and second ends 22, 23 of the hydraulic cylinders, in combination with the value for the angle of the at least section of the conveyor 14 relative to the horizontal, are utilised to derive the length of a lever arm extending perpendicularly from the pivotal mounting of the at least section of the conveyor 14 to the line of action of the hydraulic cylinders 15. The known constants also include the approximate centre of gravity of an assumed uniformly distributed load of material on the pivotable section 14 of the conveyor, which in combination with the length of the lever arm, can be used to derive the weight of material conveyed on the pivotable section of the conveyor 14. The diameter of a bore (not shown) of the hydraulic cylinders 15, and the diameter of a piston rod (not shown) of the hydraulic cylinders 15 also form part of the set of known constants. In an alternative embodiment, the section 14 of the conveyor is fixedly mounted at its first end such that its angle relative to the horizontal is fixed. In this case there is no requirement for measurement of the angle of the at least section of the conveyor 14 relative to the horizontal. As a result, the angle of the at least section of the conveyor 14 relative to the horizontal becomes one of the known constants, and any measurements of other known constants which refer to the pivotal mounting of the at least section of the conveyor 14 may be taken from the fixed mounting of the at least section of the conveyor 14. In such embodiments, the supports 15 need not be extendible. Alternatively, or in addition, the speed of the conveyor, or relevant section(s) of the conveyor, may be fixed, in which case it is not necessary to measure the speed of the conveyor, and conveyor speed may be one of the known system constants.

The result of the calculation of the weight of material being conveyed by the conveyor 11 may be expressed as the instantaneous tonnage on the conveyor 11 or a part thereof, and/or the instantaneous tonnage transported by the conveyor in any given period of time. The given period of time may be one hour, the total time lapsed since engine start, and/or the total time lapsed since a specified date and time. The result of the calculation of the weight of material being conveyed by the conveyor 11 may be displayed on a visual display 33 such as a Visual Display Unit (VDU), LCD display, or other suitable display such that the user/operator may record or use the information.

An example of how various weight calculations may be performed is provided below.

Known system constants (units of measurement in parentheses):

- A—Cylinder 15 Lower Lift point X dimension (mm)
- B—Cylinder 15 Lower Lift Point Y dimension (mm)
- C—Material C.O.G. X dimension (mm)
- D—Material C.O.G. Y dimension (mm)
- E—Cylinder 15 upper lift point Horizontal dimension (mm)
- F—Cylinder 15 upper lift point Vertical dimension (mm)
- L—Length of Weighed material on belt (i.e. supported by cylinders) (mm)
- D1—Cylinder 15 Bore (mm)
- D2—Cylinder 15 piston Rod Diameter (mm)

The following parameters values (load data and measurement data) are obtained from the load determination device 13 and the measurement devices 16, 17:

1. P1L & P1R-unladen pressure readings for each cylinder 15 (Bar) (this value is stored in a setup procedure on each initialization—when there is no load on the belt)
2. P2L & P2R-laden pressure readings for each cylinder 15 (this value may be sampled every 1, 5, 10 seconds or other time determined by the programmer)

3. G-conveyor angle reading (from inclinometer reference surface to a horizontal plane (degrees)
4. V=Belt speed (m/sec)

Using the above data, the calculation module 19 may perform the following calculations:

$T$=Average Tension in the 2 hydraulic cylinders (Kg) from: $T=\Pi*((P2L+P2R)-(P1L+P1R))/2* ((D1*D1)-(D2*D2))/(40*9.81)$ $V$=lever distance from conveyor hinge perpendicular to line of action of cylinders 15 (mm) from:
$V=\sqrt{((E*E)+(F*F))}*\mathrm{Sin}(\tan^{-1}((F+B*\mathrm{Cos}\ G-A*\mathrm{Sin}\ G)/(B*\mathrm{Sin}\ G+A*\mathrm{Cos}\ G-E))+\mathrm{Tan}^{-1}(F/E))$ $W$=Weight of Weighed Material on conveyor section, or belt, (kg) from $W=2*T*V/(C*\mathrm{Cos}\ G+D*\mathrm{Sin}\ G)$ $W\mathrm{per}M$=Weight per linear metre (kg) from $W\mathrm{per}M=W*1000/L$ TPH=Tonnes Per Hour from—
TPH=$W\mathrm{per}M*V*3600/1000$ Alternative embodiments of the invention are now described with reference to FIGS. 6, 6A and 7 in which like numerals are used to denote like parts and in respect of which the same or similar description applies as provided in relation to FIGS. 1 to 5 unless otherwise indicated and as would be apparent to a skilled person.

Figure 6:
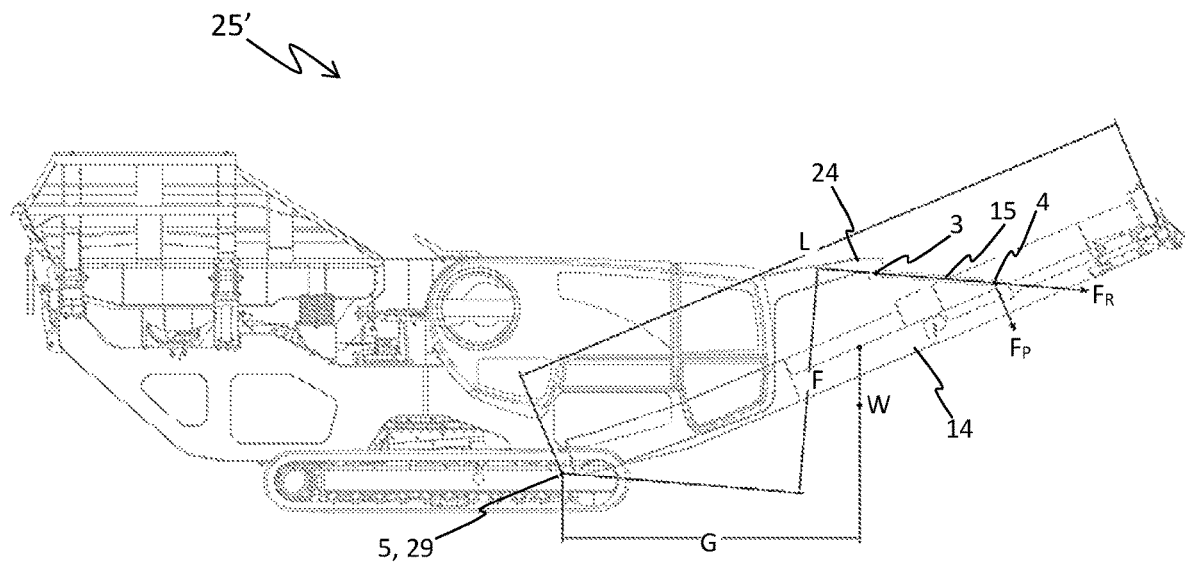
FIG. 6 is a side view of a material processing apparatus including an alternative conveyor system and conveyor weighing apparatus embodying the invention.
Figure 6A:
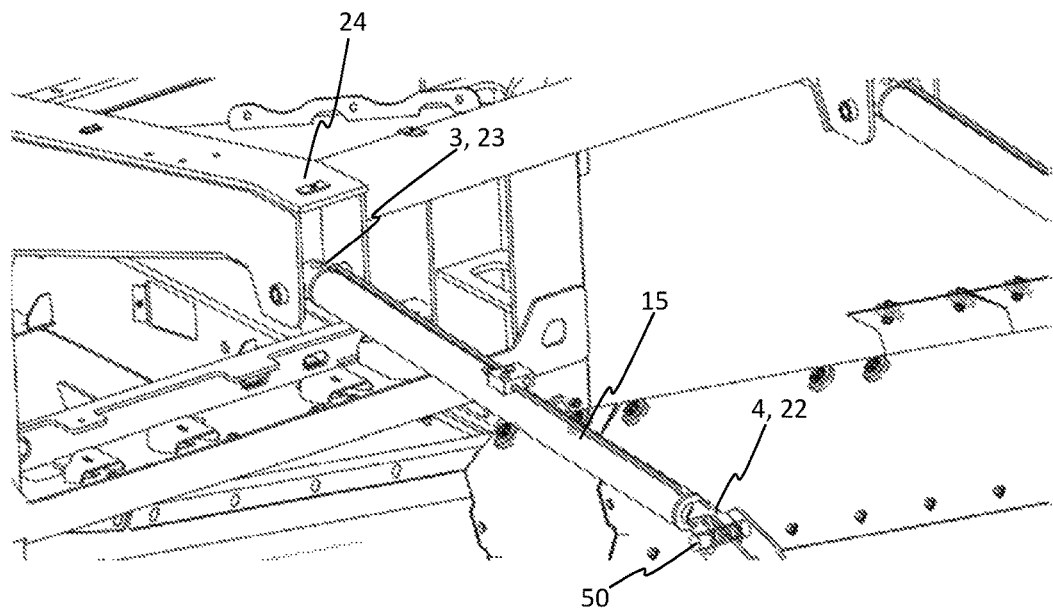
FIG. 6A is a perspective view of part of the apparatus of FIG. 6.
Figure 7:
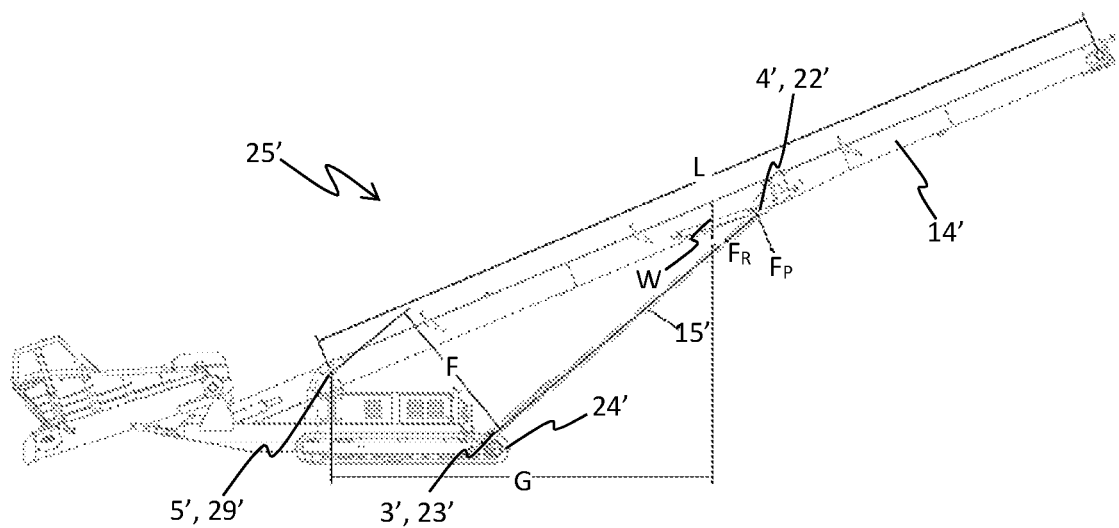
FIG. 7 is a side view of an alternative material processing apparatus including a further alternative conveyor system and conveyor weighing apparatus embodying the invention.

FIGS. 6 and 6A, show the material processing apparatus 25 in which the conveyor supports 15 support the conveyor section 14 from above. As a result, the supports 15 are loaded in tension. FIG. 7 shows an alternative material processing apparatus 25' in which the conveyor supports 15' support the conveyor section 14' from below, extending between the conveyor section 14 and a conveyor support structure 24'. As a result, the supports 15' are loaded in compression. In FIG. 7, the conveyor support structure 24' is conveniently provided by the body of the apparatus 25'.

Although not visible in FIG. 6, 6A, or 7, a respective conveyor support is typically, but not necessarily, provided at each side of the respective conveyor section 14, 14'.

In these embodiments, the load determination device 13 comprises at least one load measuring pin 50 (which may also be referred to as a load pin, or a shear pin load cell). The, or each, load pin 50 may be used to couple a respective end 22, 23 of a respective conveyor support 15, 15' to the conveyor section 14, 14' or the support structure 24, 24', as applicable. The load pin 50 may form part of a pivotable joint between the support 15, 15, and the conveyor section 14, 14' or the support structure 24, 24' as applicable. By way of example, FIG. 6A shows a load pin 50 coupling the end 22 of support 15 to the conveyor section 14, and being part of a pivotable joint. In the illustrated embodiments, the load pin 50 is provided at the end 22 of the respective support 15, 15', coupling the support 15, 15' to the conveyor section 14, 14'. Alternatively, or in addition, a respective load pin 50 may couple the respective end 23 of the conveyor support 15, 15' to the support structure 24, 24'. Typically, the, or each, load pin 50 forms part of a pivotable coupling between the respective support 15, 15' and the conveyor section 14, 14' or support structure 24, 24' as applicable. It will be understood that a respective load pin 50 may be provided at either end of any one or more of the supports 15, 15' in cases where more than one support 15, 15' is present.

The load pin 50 produces an output signal indicative of the load exerted on it by the conveyor section 14, 14'. In the illustrated embodiment, the load pin 50 is located at the end 22 of the support 15 and is arranged to measure force (load) in a direction that is perpendicular to the conveyor section 14, in particular perpendicular to the conveying surface of the conveyor section 14. This force is shown in FIGS. 6, 6A and 7 as $F_P$. In alternative embodiments, depending on the type of load pin and/or on the configuration or location of the load pin, the load pin may, alternatively or in addition, measure force in one or more other directions. In general, the load pin 50 is arranged so that it, and therefore the direction of the force(s) that it measures, has a known orientation with respect to one or more part of the apparatus 25'.

There is now described a preferred method in which the material throughput on the conveyor section 14, 14' can be calculated using the output signal of the load pin(s) 50. The, or each, load pin 50 may be located either at the connection point 4, 4' between the conveyor section 14, 14' and the respective support 15, 15' (i.e. at end 22), or at the connection point 3, 3' between the support 15, 15' the support structure 24, 24' (which is typically part of the body or chassis of the apparatus 25, 25').

Each load pin 50 provides an output load value will return a value $F_P$, being a measure of the load exerted on it by the conveyor section 14, 14'. It is desired to determine the corresponding load (force) that is exerted along the longitudinal axis of the respective support 15, 15'. This may be referred to as the resultant load $F_R$. In FIGS. 6 and 6A, the force $F_R$ is shown acting along the axis of support 15, applying tension to the support 15. In FIG. 7, the force $F_R$ is shown acting along the axis of support 15', applying compression to the support 15'. $F_R$ can be calculated from $F_P$ so long as the relative angle of inclination between the support 15, 15' and the conveyor section 14, 14' is known, in particular the angle between the longitudinal axis of the support 15, 15' and the longitudinal axis of the conveyor section 14, 14'. For example any conventional mathematical technique for resolving forces may be used for this purpose. As indicated above, the relevant geometry of the conveyor section 14, 14' and support 15, 15' may be determined in any convenient manner, e.g. by determining the angle of inclination of the conveyor section 14, 14' (which may be fixed or variable) and/or the extension of the supports 15, 15'. As indicated above, any convenient measuring device or technique may be used for determining angles and/or extensions, as required. More generally (and for example in cases where the load pin is oriented such that it does not measure load in a direction perpendicular to the conveyor section 14, 14'), so long as the relative orientation between the longitudinal axis of the support 15, 15' and the direction of $F_P$ is known, then $F_R$ can be calculated, e.g. by conventional force resolving techniques. This relative orientation is known or can be calculated because the direction of $F_P$ is known (as described earlier) and the axial direction of the support 15, 15' is either known (if the conveyor section 14, 14' is fixed) or can be calculated (e.g. as described above) if the conveyor section's angle of inclination is variable.

The preferred method involves calculating a material point load W representing the weight of material conveyed on the conveyor section 14, 14'. The material point load W is deemed to act at the centre of gravity (CoG) of an assumed uniformly distributed load of material on the conveyor section 14, 14'.

The material point load W may be calculated as:

$$W = \frac{F_R * F}{G}$$

Where $F_R$ is the conveyor support 15, 15' resultant load, F is the perpendicular distance between the line of action of $F_R$ (or the longitudinal axis of the conveyor support 15, 15') and the lower end 29, 29' of the conveyor section 14, 14' (which is the lower pivot point 5, 5' of the conveyor section 14, 14' in cases where the conveyor section 14, 14' can pivot to adjust its angle of inclination), and G is the horizontal, or perpendicular, distance between the end 29, 29' (which is typically the lower pivot point 5, 5') of the conveyor section 14, 14' and the material load CoG.

For conveyor sections 14, 14' with variable incline positions, $F_R$, F and G are variable with the conveyor section angle of inclination, and can be calculated in any convenient manner, for example using basic geometry and knowledge of the relative position between the conveyor section and a fixed point. By way of example an inclinometer may be provided on the conveyor frame or supporting structure 15, 15' to measure the conveyor section's angle or change in angle, or a linear position transducer may be provided on the support 15, 15' to measure its length or change in length.

Conveyor throughput (T) may be calculated as follows:

$$WperM = W*1000/L$$

$$T = WperM*V*3600/1000$$

Where W represents the weight of weighed material on the conveyor section 14, 14' (in kg), WperM is the weight per linear metre, L is the length of the conveyor section 14, 14' and V is the conveyor speed (e.g. belt speed). More generally, L is the length of the supported conveyor section, i.e. the conveyor or conveyor section that is supported by the supports 15, 15', which in the illustrated example corresponds to the conveyor sections 14, 14'. It is noted that in alternative embodiments the supported conveyor section may itself comprise more than one conveyor section, e.g. a mid-section and a head section.

The calculations for $F_R$, W, WperM and T may conveniently be performed by the calculation module 19.

As indicated above, in cases where there is more than one load pin 50 (e.g. a respective one coupled to a respective support 15, 15' on either side of the conveyor section 14, 14') the respective measured load values may be averaged when calculating W, or multiple values of W may be calculated and then averaged. Also as described above, the unladen weight of the conveyor section 14, 14' may be measured to allow accurate measurement of the material when the conveyor section is laden.

In alternative embodiments, the or each load pin 50 may be replaced by a load cell coupled between the conveyor support 15, 15' and the conveyor section 14, 14', or between the conveyor support 15. 15' and the support structure 24, 24', in order to measure the load acting on the conveyor support 15, 15'. Resolution of the force measured by the load cell may or may not need to be resolved along the support 15, 15' axis depending on how the particular load cell measures loads.

In preferred embodiments, to negate the affects of any external loading (i.e. loading caused by factors other than the weight of the material on the conveyor, e.g. known cyclic conditions) on the conveyor section 14, 14', values for $F_P$ may be averaged or otherwise compensated, e.g. by conventional cancellation methods using an accelerometer mounted in line with the load pin (or other measurement device as applicable) for unknown external loading conditions based on the principle of F=ma.

The invention is not limited to the embodiments described herein but can be amended or modified without departing from the scope of the present invention.

The invention claimed is:

1. A conveyor system comprising a conveyor and a conveyor weighing apparatus, the conveyor weighing apparatus comprising:
   load determination means for determining loads exerted by at least a section of the conveyor on at least one conveyor support; and
   calculation means for calculating at least one weight-related measurement for material conveyed by said conveyor using said load data;
   wherein the load determination means comprises at least one load measuring pin coupled between said at least one conveyor support and said at least a section of the conveyor, or between said at least one conveyor support and a supporting structure.

2. The conveyor system of claim 1, wherein said at least one conveyor support comprises a hydraulic ram.

3. The conveyor system of claim 1, further including measurement means for measuring the speed of said conveyor, said calculation means being configured to calculate said at least one weight-related measurement using the measured speed of the conveyor.

4. The conveyor system of claim 1, further including measurement means for measuring an angle of inclination of said at least a section of the conveyor, said calculation means being configured to calculate said at least one weight-related measurement using the measured angle.

5. The conveyer system of claim 4, wherein said means for measuring the angle of inclination comprises an angle transducer or one or more linear transducers coupled to said at least one conveyor support to determine a value for an extension of said at least one conveyor support.

6. The conveyor system of claim 1, wherein the load determination means is configured to determine the load exerted by the at least a section of conveyor in both a laden state and an unladen state of the conveyor.

7. The conveyor system of claim 1, wherein said calculation means is configured to calculate said at least one weight-related measurement using at least one system constant representing at least one aspect of the geometric configuration of said at least a section of the conveyor and the at least one conveyor support.

8. The conveyor system of claim 7, wherein said at least one system constant includes any one or more of: a location of the centre of gravity of a notional uniformly distributed load of material on the at least a section of the conveyor; and an angle of inclination of said at least a section of the conveyor.

9. The conveyor system of claim 7, wherein said at least one geometric aspect comprises the spatial co-ordinates of each end of the, or each, conveyor support, or a length of said at least a section of the conveyor.

10. The conveyor system of claim 1, wherein said at least one conveyor support is coupled between said at least a section of the conveyor and a supporting structure.

11. The conveyor system of claim 1, wherein the at least a section of the conveyor has a first end fixably or pivotably mountable to a second section of the conveyor system and a second free end distal the first end.

12. The conveyor system of claim 1, wherein the at least a section of the conveyor is supported by said at least one conveyor support at a support location between the first and second ends of the at least a section of the conveyor.

13. The conveyor system of claim 1, wherein the calculation means comprises a Programmable Logic Controller (PLC) or other processor.

14. The conveyor system of claim 1, wherein said at least one load measuring pin is part of a pivotable joint between said at least one conveyor support and said at least a section of the conveyor, or between said at least one conveyor support and a supporting structure.

15. The conveyor system of claim 1, wherein said calculation means is configured to determine a resultant load acting along the longitudinal axis of said at least one conveyor support.

16. The conveyor system of claim 15, wherein said calculation means is configured to calculate a weight of material on said at least one conveyor section as $$W = \frac{F_R * F}{G}$$

where FR is the resultant load, F is the perpendicular distance between the line of action of FR and a lower end said at least one conveyor section, and G is the perpendicular distance between the lower end of said at least one conveyor section and a location of the centre of gravity of a notional uniformly distributed load of material on the at least a section of the conveyor.

17. The conveyor system of claim 15, wherein said calculation means is configured to determine said resultant load by resolving the load measured by said load determination means along the longitudinal axis of said at least one conveyor support.

18. The conveyor system of claim 1, wherein said conveyor system is included in a material processing apparatus.

19. A method of weighing the material transported by a conveyor or section thereof, the method comprising:

providing at least one load measuring pin between at least one conveyor support and at least a section of the conveyor, or between at least one conveyor support and a supporting structure;

determining loads exerted by said at least a section of the conveyor on said at least one conveyor support; and calculating at least one weight-related measurement for material conveyed by said conveyor or said section thereof using said load data.

20. A conveyor system comprising a conveyor and a conveyor weighing apparatus, the conveyor weighing apparatus comprising:

load determination means for determining loads exerted by at least a section of the conveyor on at least one conveyor support; and calculation means for calculating at least one weight-related measurement for material conveyed by said conveyor using said load data;

wherein said calculation means is configured to determine a resultant load acting along the longitudinal axis of said at least one conveyor support; and wherein said calculation means is configured to calculate a weight of material on said at least one conveyor section as $$W = \frac{F_R * F}{G}$$

where FR is the resultant load, F is the perpendicular distance between the line of action of FR and a lower end said at least one conveyor section, and G is the perpendicular distance between the lower end of said at least one conveyor section and a location of the centre of gravity of a notional uniformly distributed load of material on the at least a section of the conveyor.

* * * * *